L. B. Crittenden,
Brick Machine.

Nº 66,468.          Patented July 9, 1867.

Inventor:
Lyman B. Crittenden
by Bakewell & Christy
his Attorneys

United States Patent Office.

LYMAN B. CRITTENDEN, OF PITTSBURG, PENNSYLVANIA.

*Letters Patent No. 66,468, dated July 9, 1867.*

IMPROVEMENT IN BRICK MACHINE.

*The Schedule referred to in these Letters Patent and making part of the same.*

TO ALL WHOM IT MAY CONCERN:

Be it known that I, LYMAN B. CRITTENDEN, of Pittsburg, in the county of Allegheny, and State of Pennsylvania, have invented a new and useful Improvement in Off-Bearing Brick Machines; and I do hereby declare the following to be a full, clear, and exact description thereof, reference being had to the accompanying drawings, making a part of this specification, in which—

Like letters of reference indicate like parts.

My invention relates to that class of brick machines which deliver brick, shaped and pressed, either direct from the moulds or by an endless belt or carrier. In such cases the bricks have generally been removed by hand, to be transported to the oven, kiln, or drying-floor. Such handling, as the bricks are still in a state more or less plastic, necessarily injures them, besides involving a considerable outlay and waste of time and labor. The nature of my invention consists in the construction and operation of devices by which bricks will be delivered, when shaped or pressed, by a belt or carrier, or otherwise, on to trays, which are moved intermittently to receive them, and which trays, when full, are discharged on to a receiving-bed, whence they can easily be removed to the oven, kiln, or drying-floor.

To enable others skilled in the art to make and use my invention, I will proceed to describe its construction and mode of operation.

Figure 1:
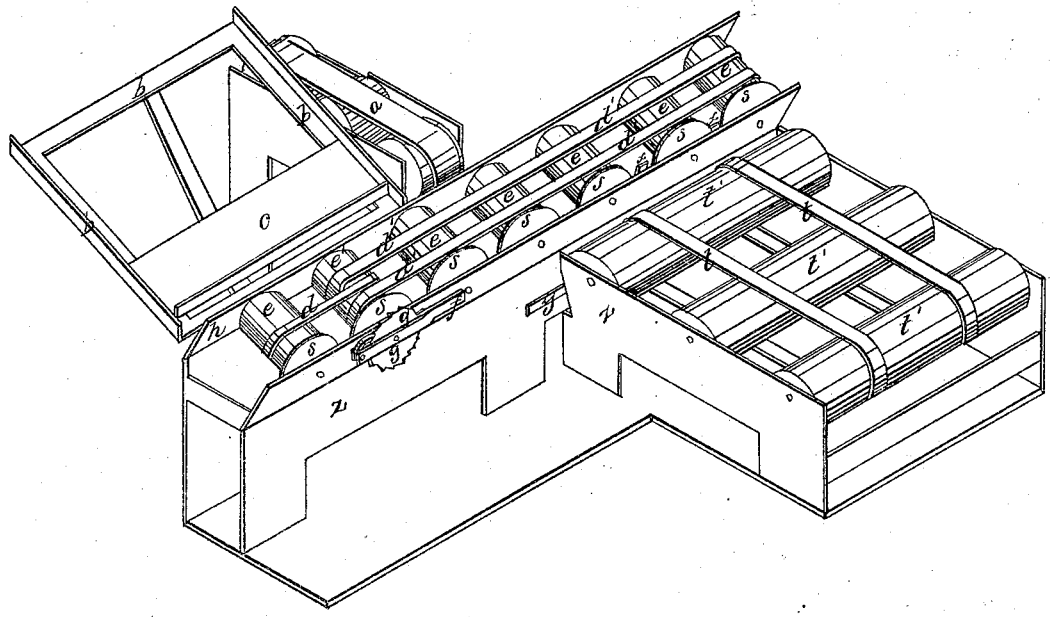
Figure 1 is a perspective view of my improved machine.
Figure 2:
Figure 2 shows a device belonging thereto, as hereinafter to be explained.

$a$ represents an endless belt or carrier, on which the bricks are carried from the brick machine which forms them, and which is by appropriate gearing connected with or to the power necessary to operate it. $b$ is a sliding frame, on which trays $c$, of any desirable or suitable construction, are placed one after the other; but as I usually make them, their length is such as is convenient for handling, and their width equal or nearly equal to the length of the brick to be manufactured. The frame $b$ is inclined at such an angle that the trays $c$, when placed on it, will slide down of their own weight as each successive lower tray is slipped off the frame $b$ on to the carrier-belts $d\ d'$. These carrier-belts operate on or around a series of rollers, $e\ e'$, which are usually arranged across the line of direction of the carrier $a$, and either inclined somewhat to its plane or horizontal, but in such a way that as the bricks are discharged one after another from the carrier $a$, they will fall on to and across the tray $c$, as it rests on the carrier-belts $d\ d'$, or, in the absence of such belts, on the rollers $e\ e'$. The requisite motion to move the trays $c$ along on the carrier-belts $d\ d'$, or over the rollers $e\ e'$, I communicate by hand or other convenient power to a ratchet device, consisting of a lever, $f$, which carries and operates the pawl $i$, which in turn plays into the ratchet-teeth of the wheel, $g$. As shown in the drawings, the lever $f$ and wheel $g$ are both attached to the axle of one of the rollers $e'$. By operating the ratchet-lever $f$ an intermittent motion is communicated to the carrier-belts $d\ d'$ and tray $c$, resting thereon; and the parts are so adjusted and operated that as soon as a brick is deposited on the tray $c$ from the carrier $a$, the tray $c$ will be carried forward a distance equal to or slightly in excess of the width of a brick, so as to be in position to receive another. This motion is continued till one tray is full, when it is carried along by the same motion, and another tray following is loaded in the same manner. For the ratchet-device above described other means of producing intermittent motion, either well known or in general use, may be substituted. On the rear or back face of the plate $h$, which supports an end of each of the rollers $e\ e'$, I attach a device, shown in fig. 2, for the purpose of supplying trays from the sliding frame $b$ to the carrier-belts $d\ d'$. Such devices may be connected with the axles of one or more of the rollers $e\ e'$, but I usually connect them with the axle of the roller $e'$, situate at or near the middle of the lower edge of the sliding frame $b$, and to which axle also, as a matter of convenience, I attach the ratchet-devices above described. As shown in the drawings, the pinion $l$, operated by the axle of the roller $e'$, plays into and operates the gear-wheel $m$, which latter, as it revolves, by a projecting pin, $n$, operates a slide, $o$, on the back face of the plate $h$ (fig. 1) upward against the bottom of each lower tray $c$, in the frame $b$, raises the tray $c$ upward till it clears the plate $h$, when it will slide by its own weight on to the carrier-belts $d\ d'$. The pinion $l$ and gear-wheel $m$ are so constructed and arranged relative to each other, and to the length of the trays $c$, that the latter will by their action be successively delivered from the frame $b$ on to the carrier-belts $d$, as soon as the preceding tray shall have left the requisite room; or in other words, the gear-wheel $m$ must make one revolution while the tray on the carrier-belts $d\ d'$ is moved forward its own length. In this way trays are delivered on to the carrier-belts $d\ d'$ as fast as they are filled. The slide $o$ is provided with a projecting lip $o'$, against which the pin $n$ operates to carry it up. Also I make a flange $s$ on the lower ends of the rollers $e\ e'$ to retain the trays in their proper position while being carried along as above described. The trays are carried along over the rollers $e\ e'$, receiving a brick at a time from the carrier $a$, and after being loaded they are discharged successively on to the belts $t$, operating round the rollers $t'$, whence they are removed by hand or otherwise to the oven, kiln, or drying-floor. On arriving opposite to the rollers $t'$ the lower edge of the tray is raised so as to pass over the flanges $s$ by the trippers $x$, which are operated by the lever $y$, pivoted to the frame $z$ of the machine. To move the lever $y$ I use either hand or other power at pleasure. The loaded trays will then slide by their own weight on to the belts $t$, as above stated. The whole of the devices described are attached to and operated in any convenient or suitable framework $z$. The belts $t$ and rollers $t'$ may operate horizontally or otherwise at pleasure; and if so desired, they may carry the loaded trays directly to the oven or kiln. In such case I connect them in any of the ordinary ways with the machinery necessary to operate them.

The usefulness of my invention is shown chiefly in that it does by machinery work which has heretofore been commonly done by hand, and work, too, which, with our best brick machines, is of no inconsiderable amount. It also does the work better, since the bricks, as yet undried, are, by my machine, not liable to injury by either careful or careless handling. And it leaves them on trays of shape and construction convenient for moving, on which trays they may be dried in a kiln or oven, or on a drying-floor, or from which they may be easily removed for the same or other purposes. I do not limit myself to any particular mode of operating the belts $d\ d'$. As shown in the drawings, they pass around the roller $e'$, and in any case they should pass around some roller or rollers, by which motion will be communicated to them.

Having thus described my invention, what I claim therein, and desire to secure by Letters Patent, is—

1. The arrangement of devices in an off-bearing brick machine for supplying trays from the inclined sliding-frame $b$ to the belts $d\ d'$ or rollers $e\ e'$, such devices consisting of the slide $o$, with a projection, $o'$, in combination with suitable gearing for communicating motion to and operating the same, and in such a way that a tray will be supplied to the belts $d\ d'$ or rollers $e\ e'$, as soon as each preceding tray shall have passed the foot of the frame $b$, substantially in the manner and for the purposes above set forth.

2. The rollers $e\ e'$ of an off-bearing brick machine, in any desirable number, and either with or without belts $d\ d'$, and arranged either horizontally or inclined, in combination with a ratchet or other equivalent device for producing intermittent motion, by which a tray resting thereon will be carried forward sufficiently to receive successively a brick at a time, substantially as and for the purposes hereinbefore set forth.

In testimony whereof, I, the said LYMAN B. CRITTENDEN, have hereunto set my hand in presence of—

LYMAN B. CRITTENDEN.

Witnesses:
  A. S. NICHOLSON,
  GEORGE H. CHRISTY.